United States Patent
Chang et al.

(10) Patent No.: US 12,508,765 B1
(45) Date of Patent: Dec. 30, 2025

(54) THERMOFORMING PIPE-SHAPING MACHINE

(71) Applicant: SHIN YUEH APPLIED MATERIALS CO., LTD., Taoyuan (TW)

(72) Inventors: Ming-Hsien Chang, Taoyuan (TW); Ching-Hsien Chen, Taoyuan (TW)

(73) Assignee: SHIN YUEH APPLIED MATERIALS CO., LTD., Taoyuan (TW)

( * ) Notice: Subject to any disclaimer, the term of this patent is extended or adjusted under 35 U.S.C. 154(b) by 40 days.

(21) Appl. No.: 18/769,319

(22) Filed: Jul. 10, 2024

(51) Int. Cl.
  *B29C 51/18* (2006.01)
  *B29C 51/00* (2006.01)
  *B29K 27/18* (2006.01)
  *B29L 23/00* (2006.01)

(52) U.S. Cl.
  CPC ............ *B29C 51/18* (2013.01); *B29C 51/002* (2013.01); *B29K 2027/18* (2013.01); *B29L 2023/22* (2013.01)

(58) Field of Classification Search
  None
  See application file for complete search history.

(56) References Cited

U.S. PATENT DOCUMENTS 4,427,616 A * 1/1984 Ketcham ................. B29C 53/30
425/336

FOREIGN PATENT DOCUMENTS

CN        219650556 U  *  9/2023
WO   WO-2018112771 A1  *  6/2018   ............ B29C 51/42

* cited by examiner

*Primary Examiner* — Yung-Sheng M Tsui
(74) *Attorney, Agent, or Firm* — Leong C. Lei

(57) ABSTRACT

A thermoforming pipe-shaping machine includes a chassis, an electric machine control assembly beside the chassis, a push unit arranged on the chassis, a rotation unit arranged on the push unit, a clamp unit arranged on the push unit, a heating and forming unit arranged on the chassis, and a clip unit at one end side of the chassis. The rotation unit receives a shaping bar on which a Teflon pipe is sleeved to fit therein. The shaping bar includes one end threaded portion. The rotation unit drives the shaping bar to rotate. The push unit drives the rotation unit to slide on the chassis. The clamp unit clamps the shaping bar carrying the Teflon pipe. The heating and forming unit performs an operation of heating and pressing on the threaded portion of the shaping bar carrying the Teflon pipe to shape the Teflon pipe into a spiral form.

10 Claims, 12 Drawing Sheets

THERMOFORMING PIPE-SHAPING MACHINE

BACKGROUND OF THE INVENTION

(a) Technical Field of the Invention

The present invention relates to a thermoforming pipe-shaping machine, and more particularly to a thermoforming pipe-shaping machine that enhances diversification, convenience, and processing accuracy of processing a Teflon pipe of chemical industry into a spiral form.

(b) Description of the Prior Art

For corrosion-resistant pipes used in the chemical industry, due to the need to match the property of the chemicals conveyed therethrough, some corrosion-resistant pipes must be implemented as spiral pipes. Due to the chemical properties of chemicals, the spiral pipes used for conveying such chemicals cannot be produced by injection molding or extrusion molding.

Thus, it is a challenge of the chemical spiral pipe manufacturers to provide a thermoforming pipe-shaping machine for easing shaping of a spiral configuration of a pipe for conveying chemicals.

SUMMARY OF THE INVENTION

The primary objective of the present invention is to provide a thermoforming pipe-shaping machine that enhances diversification, convenience, and processing accuracy of processing a Teflon pipe of chemical industry into a spiral form.

For such an objective, in some technical solutions of the present invention, a thermoforming pipe-shaping machine is provided, comprising a chassis, an electric machine control assembly arranged at one side of the chassis, a push unit arranged on the chassis, a rotation unit arranged on the push unit, a clamp unit arranged on one side of the push unit, a heating and forming unit arranged on one side of the chassis, a clip unit arranged at one end side of the chassis; the rotation unit receiving a shaping bar on which a Teflon pipe to be processed is sleeved to fit therein and clamp thereby, the shaping bar at least comprising one end threaded portion, the rotation unit being operable to drive the shaping bar to rotate; the push unit being operable to push the rotation unit to slide on the chassis, the clamp unit being operable to clamp the shaping bar on which the Teflon pipe to be processed is sleeved, the heating and forming unit being operable to carry out a processing operation of heating and pressing on the threaded portion of the shaping bar on which the Teflon pipe to be processed is sleeved to have the Teflon pipe to be processed sleeved on the threaded portion of the shaping bar shaped into a spiral form.

The efficacy that the present invention may achieve by adopting some technical solutions is that diversification, convenience, and processing accuracy of processing a Teflon pipe of chemical industry into a spiral form.

DETAILED DESCRIPTION OF THE PREFERRED EMBODIMENTS

Figure 1:
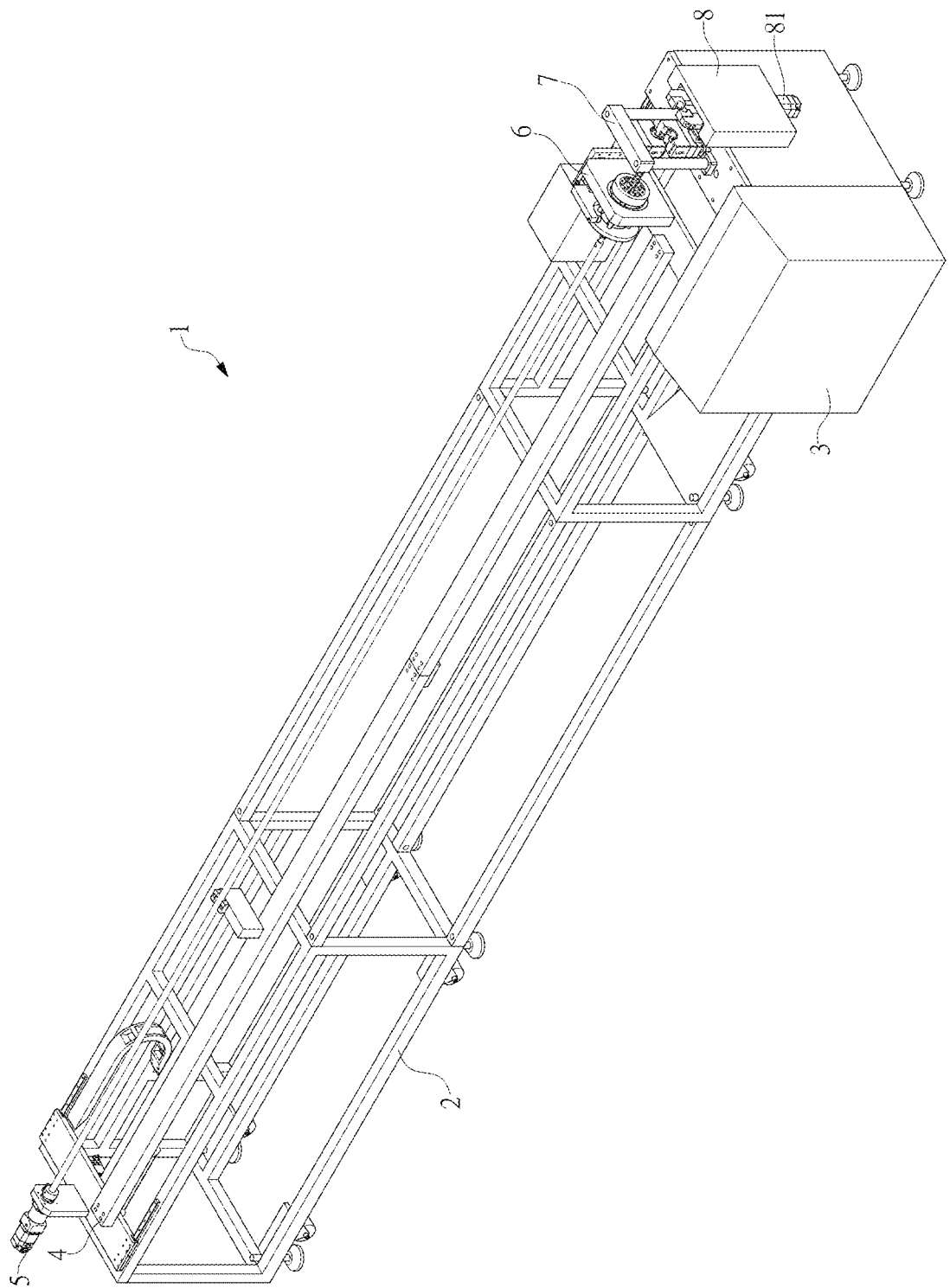
FIG. 1 is a schematic view of a thermoforming pipe-shaping machine according to the present invention.
Figure 2:
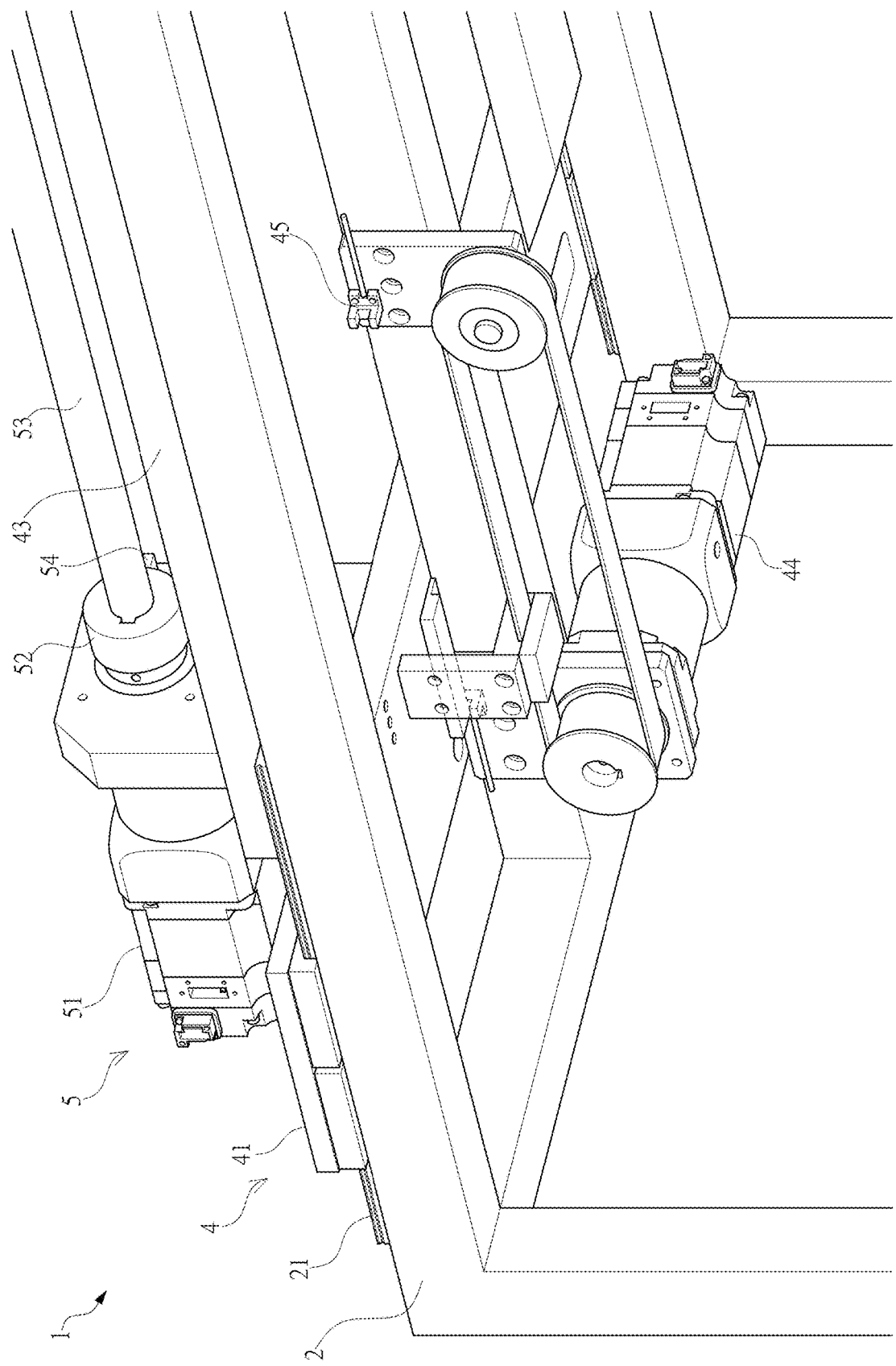
FIG. 2 is a partial perspective view of a push unit and a rotation unit according to the present invention.
Figure 3:
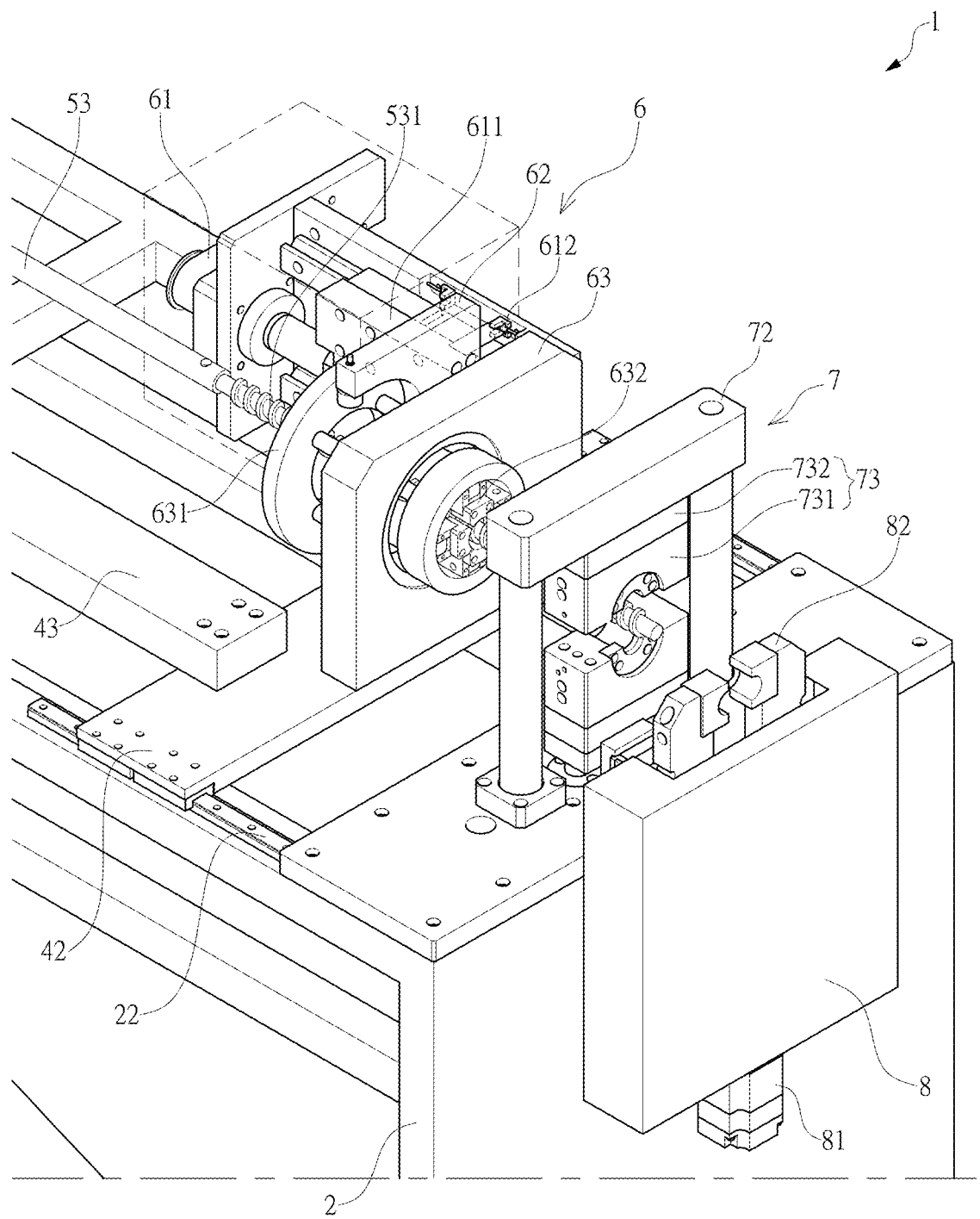
FIG. 3 is perspective view of a clamp unit, a heating and forming unit, and a clip unit according to the present invention.
Figure 4:
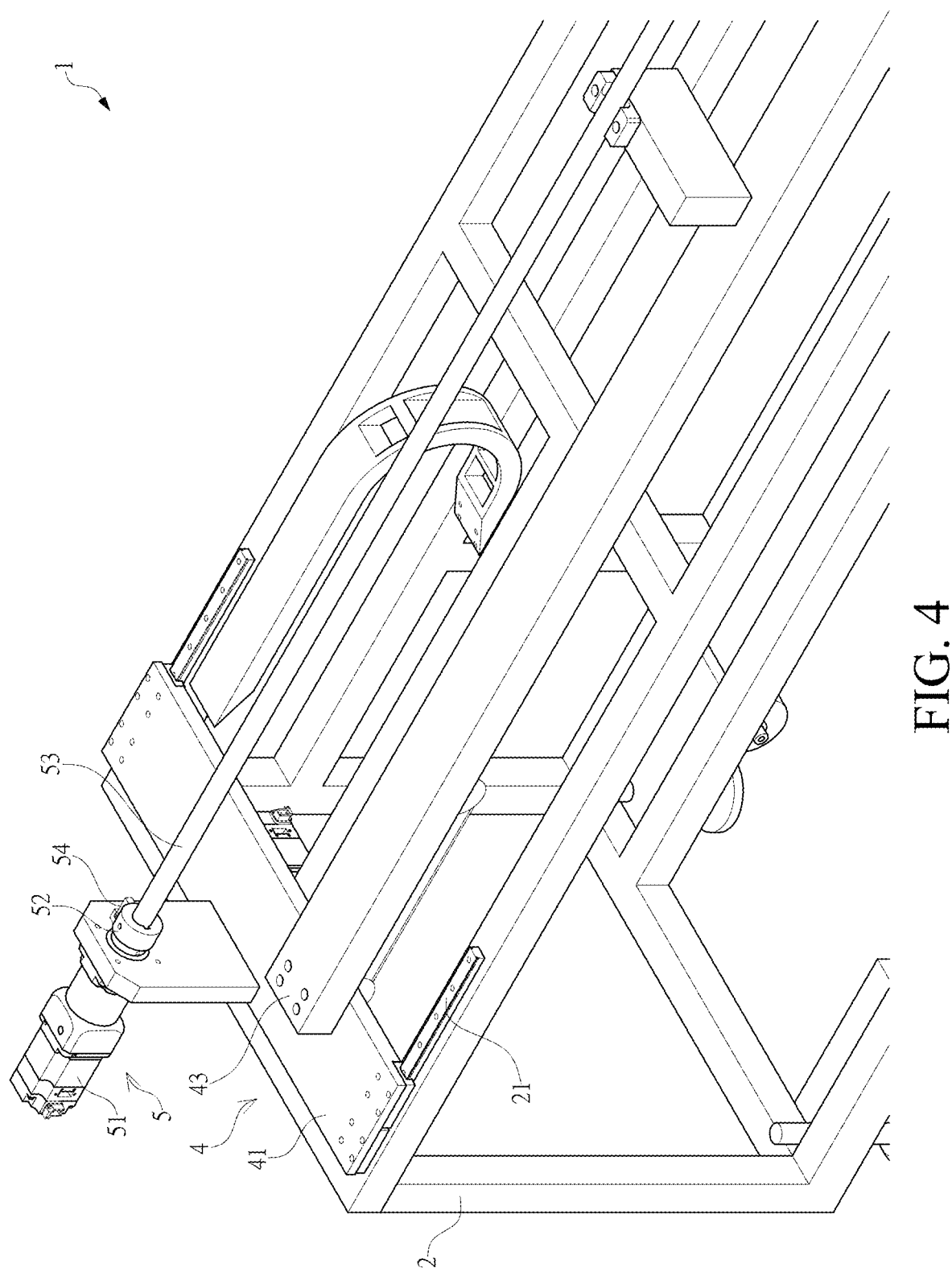
FIG. 4 is a perspective view showing fitting and clamping of the rotation unit and a shaping bar according to the present invention.
Figure 5:
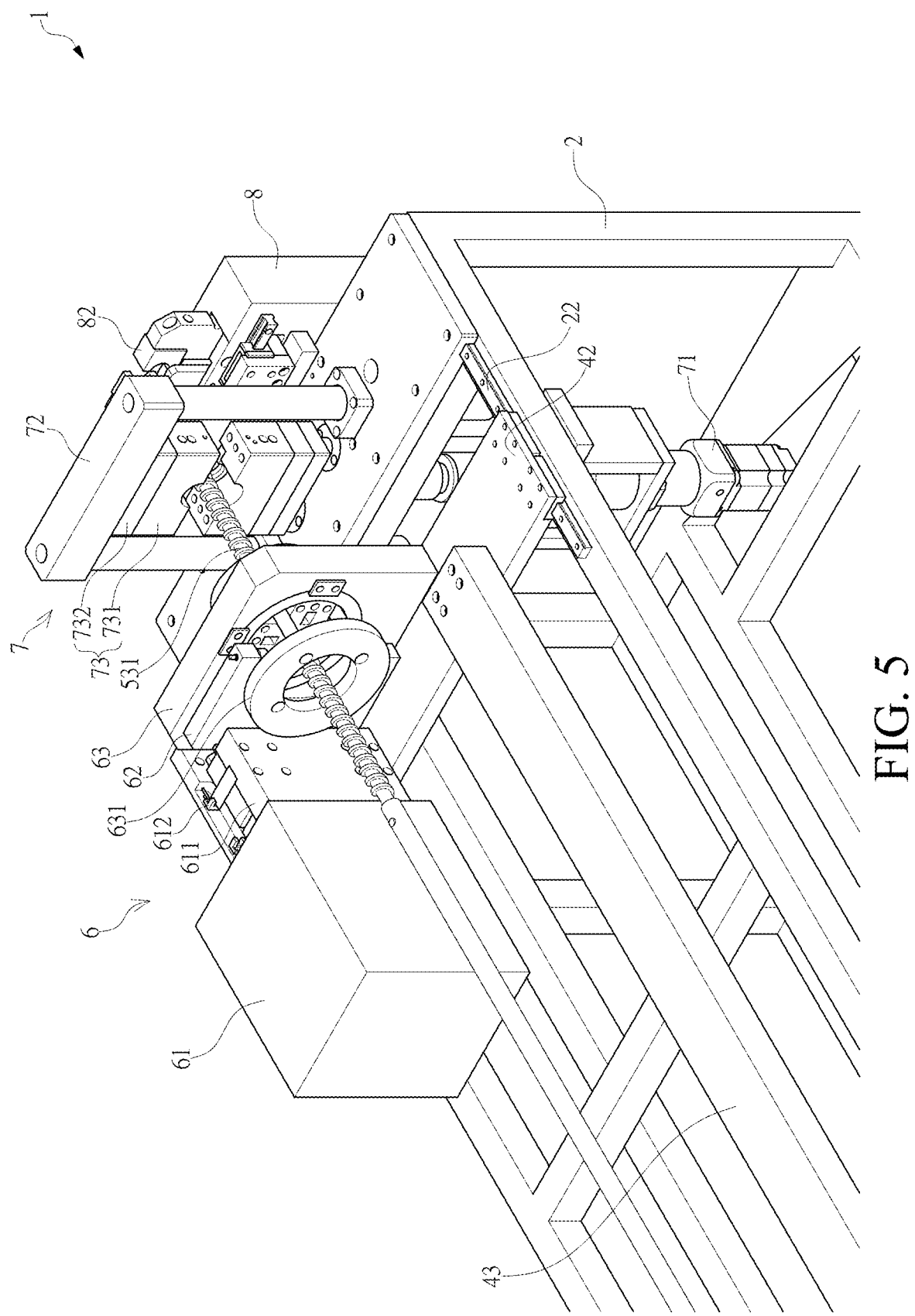
FIG. 5 is a perspective view of the shaping bar and the heating and forming unit according to the present invention.
Figure 6:
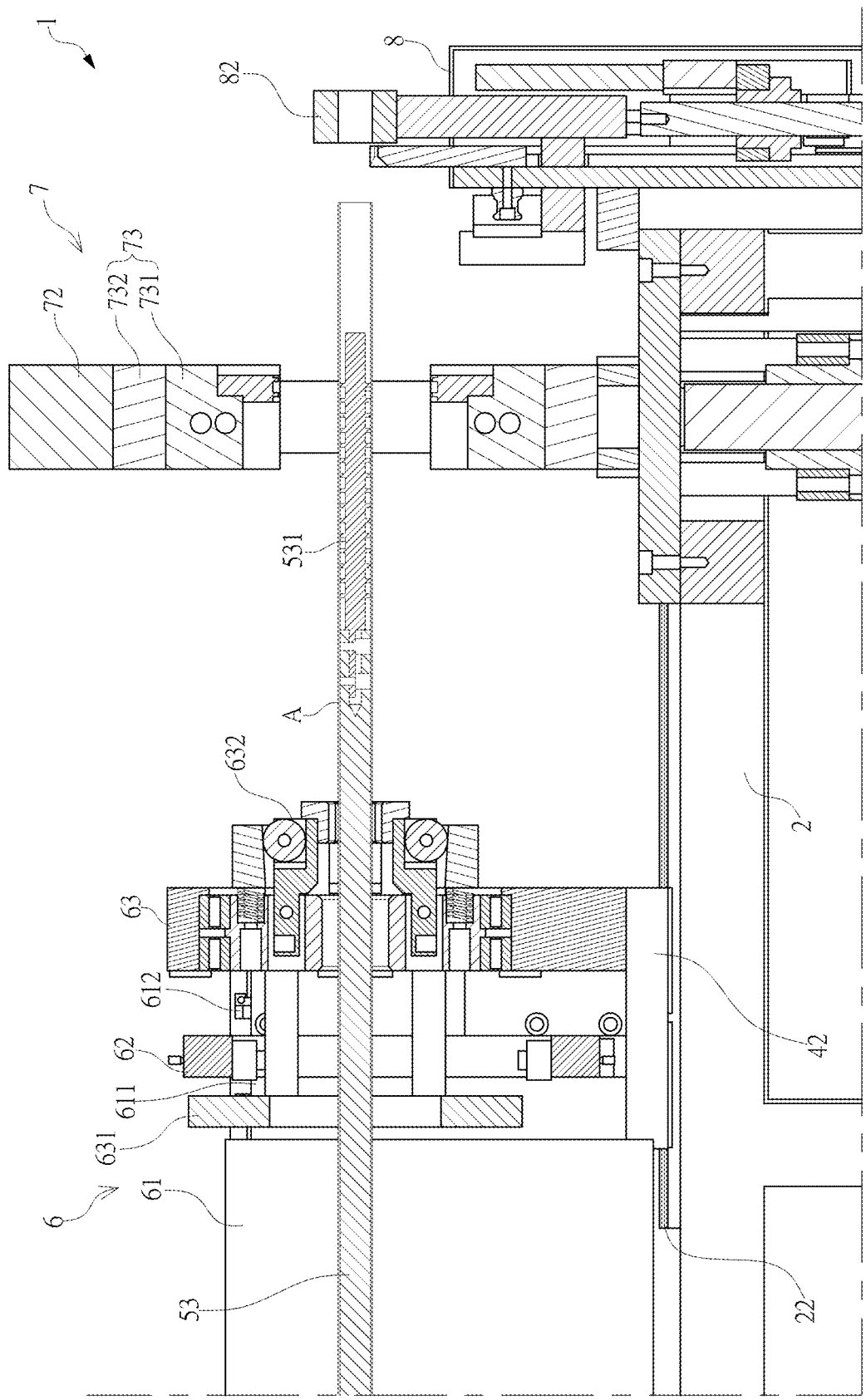
FIG. 6 is a schematic view showing initial of processing operation of a Teflon pipe according to the present invention.
Figure 7:
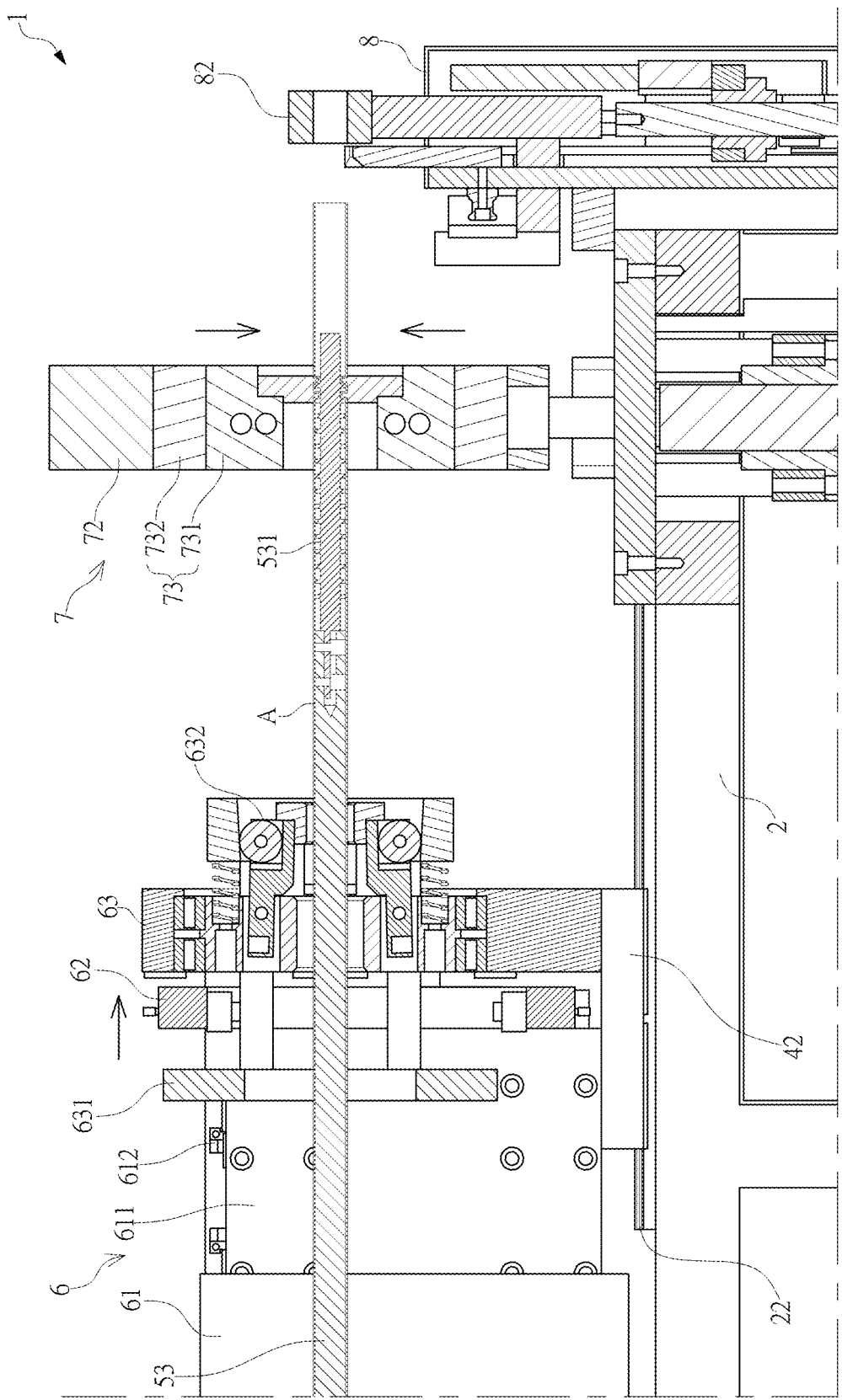
FIG. 7 is a schematic view showing, in a Teflon pipe processing operation, the clamp unit clamping operation according to the present invention.
Figure 8:
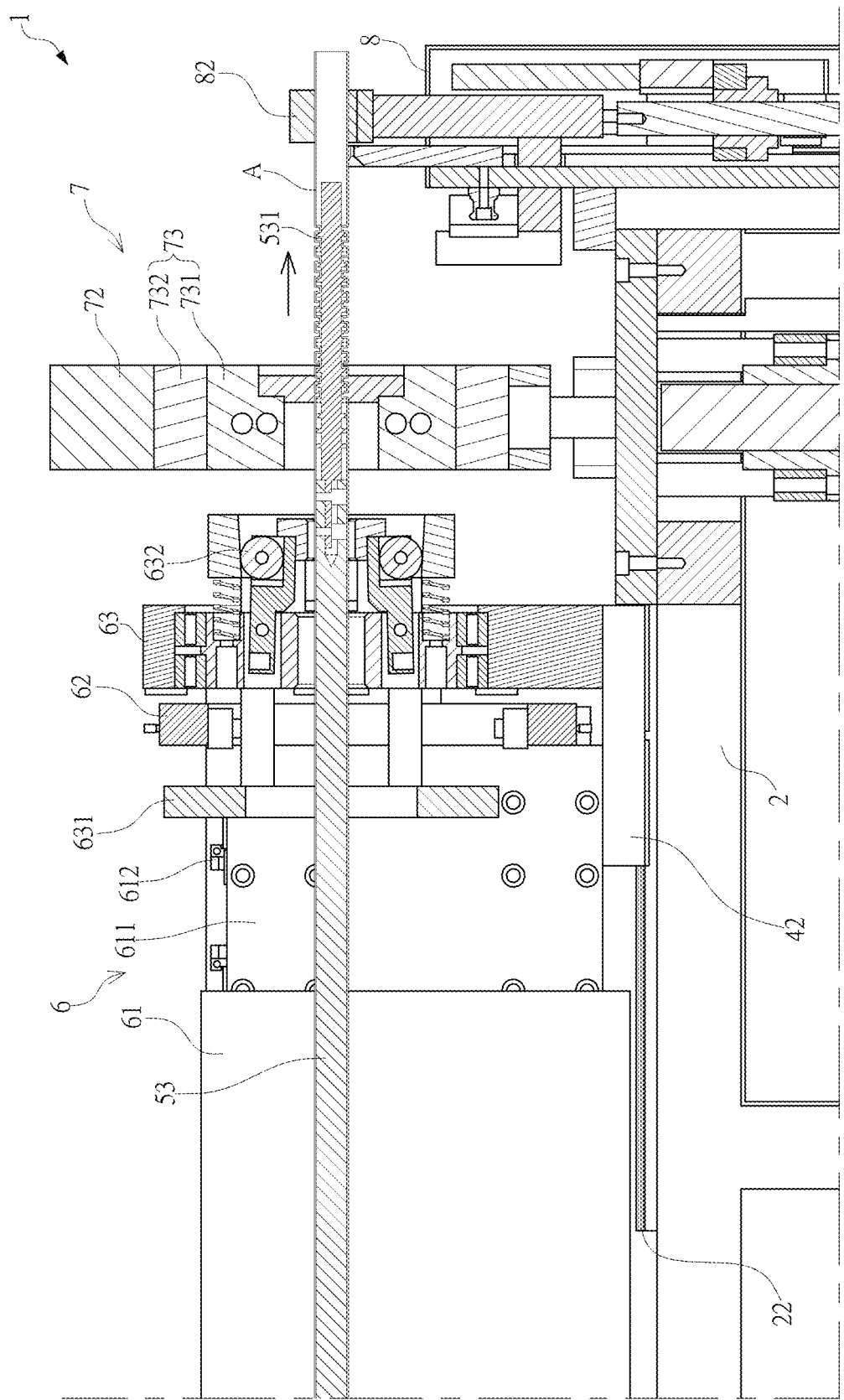
FIG. 8 is a schematic view showing, in a Teflon pipe processing operation, the heating and forming unit operating according to the present invention.
Figure 9:
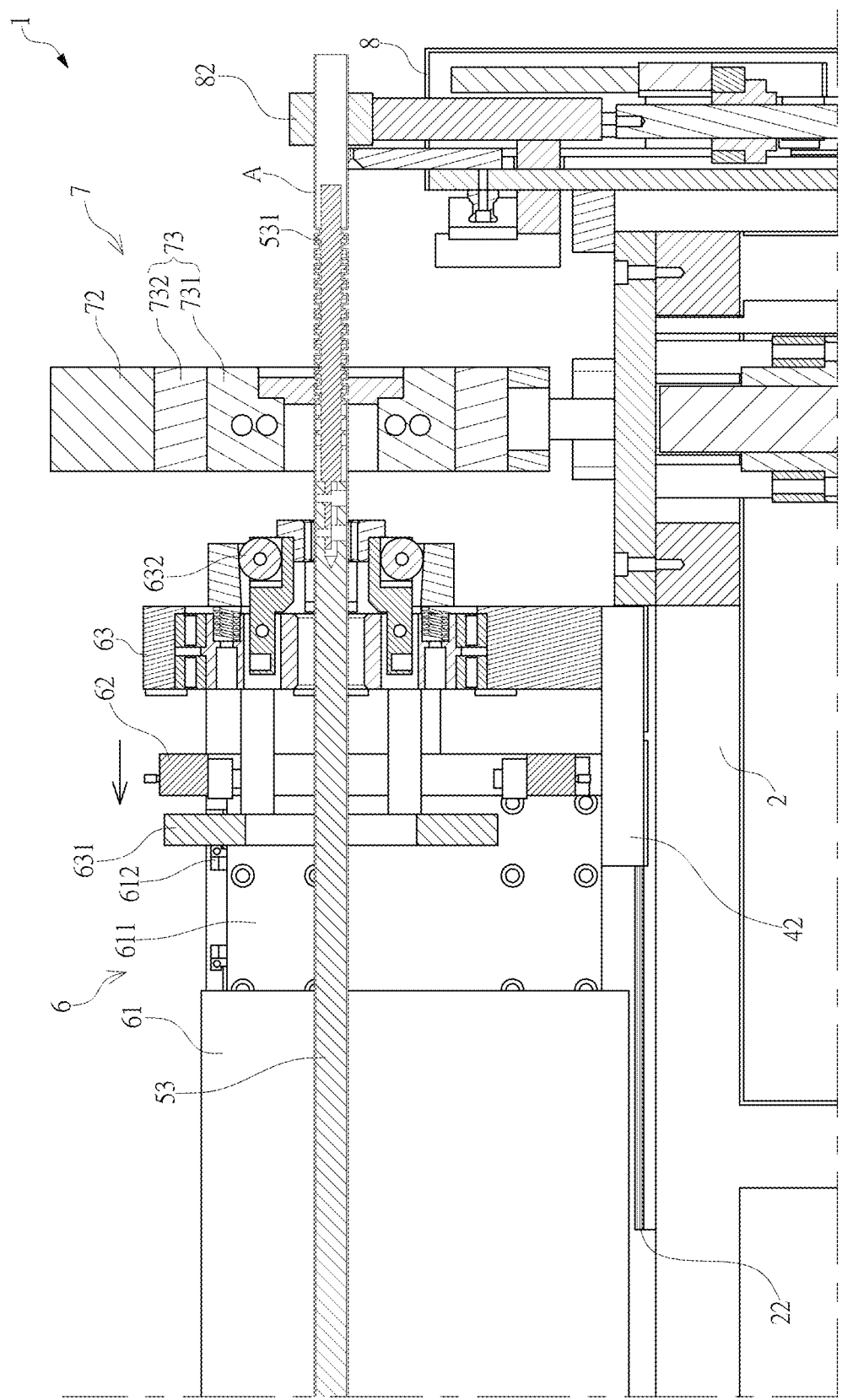
FIG. 9 is a schematic view showing operation completing, in a Teflon pipe processing operation, for the clamp unit and the heating and forming unit according to the present invention.
Figure 10:
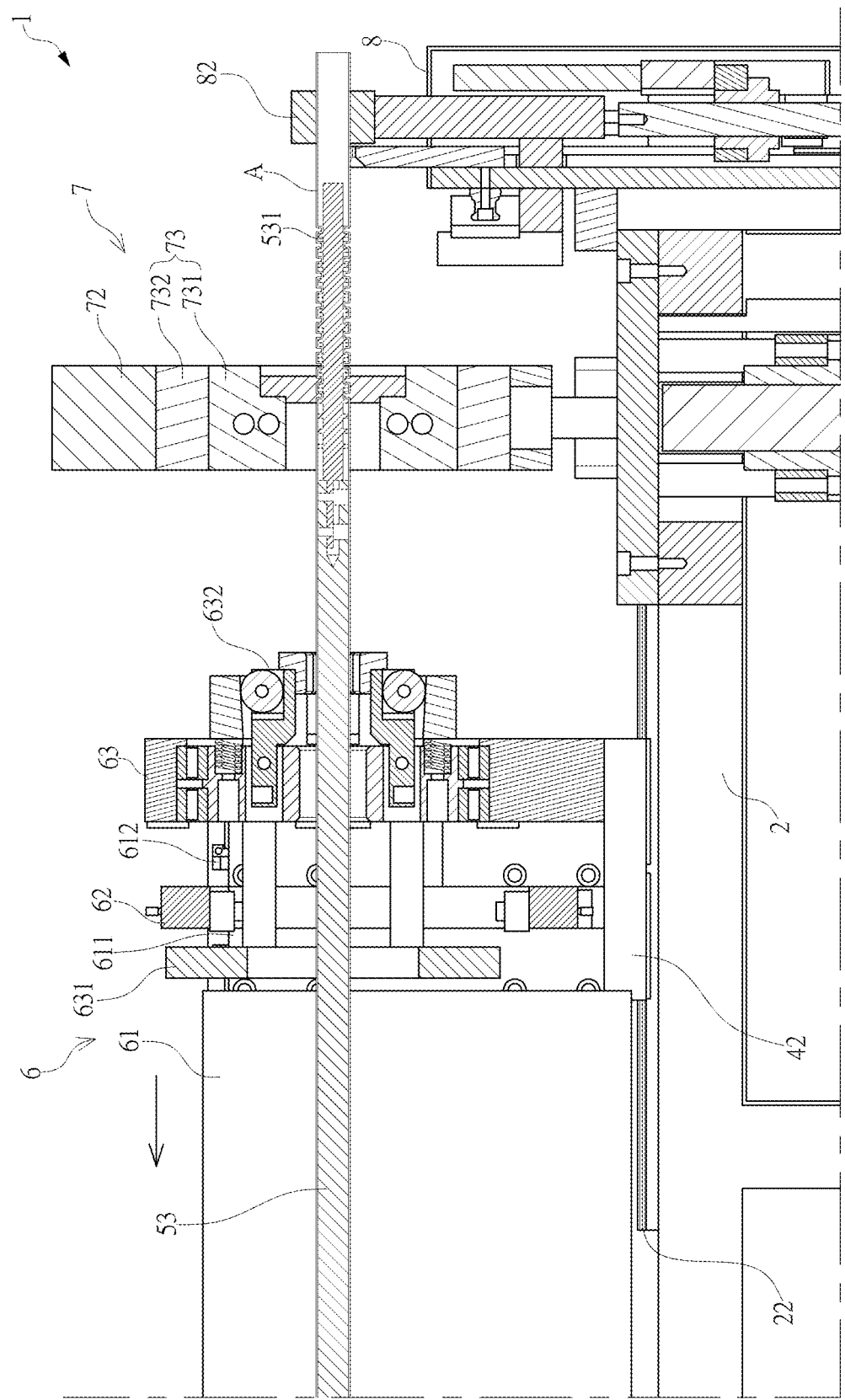
FIG. 10 is a schematic view showing, in completion of a Teflon pipe processing operation, the clip unit clipping operation according to the present invention.
Figure 11:
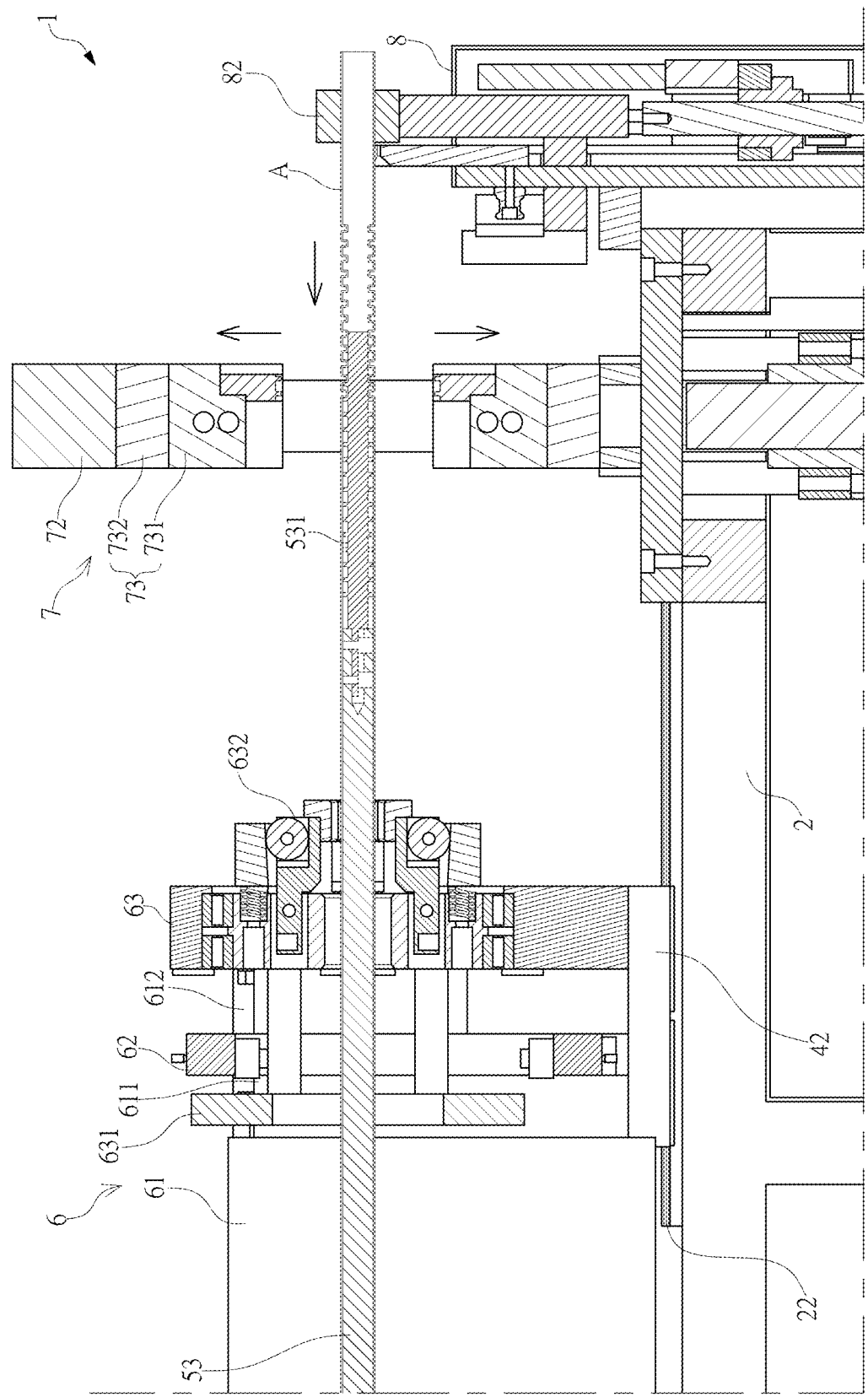
FIG. 11 is a schematic view showing, in completion of a Teflon pipe processing operation, the push unit and the rotation unit reversely rotating operation according to the present invention.

Firstly, referring to FIGS. 1, 2, 3, 4, and 5, a thermoforming pipe-shaping machine 1 according to the present invention comprises a chassis 2, an electric machine control assembly 3 arranged at one side of the chassis 2, a push unit 4 arranged on the chassis 2, a rotation unit 5 arranged on the push unit 4, a clamp unit 6 arranged on one side of the push unit 4, a heating and forming unit 7 arranged on one side of the chassis 2, and a clip unit 8 arranged at an end side of the chassis 2.

As shown in FIGS. 1, 2, 3, 4, and 5, the chassis 2 is implemented in the present invention in the form of a rectangular frame; two side ends of the chassis 2 are respectively provided with a first rail 21 and a second rail 22 that are arranged pairwise as a left one and a right one; the first rail 21 and the second rail 22 are provided for disposition of the push unit 4 thereon; the chassis 2 is provided, at a lower side of the second rail 22, with the electric machine control assembly 3.

As shown in FIGS. 1, 2, 3, 4, and 5, the electric machine control assembly 3 is electrically connected to an external power source, in order to obtain electrical power necessary for operation of the thermoforming pipe-shaping machine 1.

As shown in FIGS. 1, 2, 3, 4, and 5, two end sides of the push unit 4 are respectively provided with a first slide block 41 and a second slide block 42; the first slide block 41 is arranged, in a slidable manner, on the first rail 21 of the chassis 2, and the second slide block 42 is arranged, in a slidable manner, on the second rail 22 of the chassis 2; the push unit 4 is provided with a connection rod 43 arranged on the first slide block 41 and the second slide block 42; the push unit 4 is connected with a power portion 44 at a lower side of the first slide block 41, the power portion 44 being implemented in the present invention in the form of an electrical motor, the power portion 44 being electrically connected to the electric machine control assembly 3 to obtain electrical power supply necessary for operation, the power portion 44 being further provided with a position sensor 45, the position sensor 45 being operable to detect and limit a sliding distance of the first slide block 41, wherein as the connection rod 43 is arranged between the first slide block 41 and the second slide block 42, the second slide block 42 is also caused to slide the same distance on the second rail 22 in a passive manner, so as to make the entirety of the push unit 4 to slide a predetermined distance in a longitudinal axis direction of the chassis 2 on the first rail 21 and the second rail 22 of the chassis 2; more specifically, the first rail 21 and the second rail 22 of the chassis 2 are arranged to have a predetermined length, and the position sensor 45 on the power portion 44 limits the operation of the power portion 44 so as to limit the sliding distance of the first slide block 41 to ensure a pushing distance of the entirety of the push unit 4; the position sensor 45 is further applied, through control of the electric machine control assembly 3, to have the power portion 44 rotate reversely to cause the push unit 4 to slide back to an original start point, meaning the position detector 45 is operable to have the power portion 44 stopping operation and operating in a reversed direction, in order to make the entirety of the push unit 4 to slidable back and forth on the first rail 21 and the second rail 22 of the chassis 2 for a predetermine distance in the longitudinal axis direction of the chassis 2; in implementation of the present invention, the sliding distance of the entirety of the push unit 4 moving back and forth in the longitudinal axis direction of the chassis 2 is defined by the length of the first rail 21 and the second rail 22.

As shown in FIGS. 1, 2, 3, 4, and 5, the rotation unit 5 is arranged on the first slide block 41 of the push unit 4, so that when the push unit 4 is sliding back and forth for the predetermined distance in the longitudinal axis direction of the chassis 2 on the first rail 21 and the second rail 22 of the chassis 2, the rotation unit 5 slides back and forth, in synchronization with the push unit 4, for the predetermined distance in the longitudinal axis direction of the chassis 2; the rotation unit 5 comprises a power portion 51, and the power portion 51 is implemented in the present invention in the form of an electrical motor, the power portion 51 being electrically connected to the electric machine control assembly 3 to obtain electrical power supply necessary for operation, a front end of the power portion 51 is provided with a fitting and clamping section 52, the fitting and clamping section 52 receiving the shaping bar 53 to fit therein and to be clamped thereby, the shaping bar 53 being provided, on a front end thereof, with a threaded portion 531, operation of the power portion 51 driving the shaping bar 53 to rotate so as to revolve; the power portion 51 comprises a sensor 54 beside the fitting and clamping section 52, the sensor 54 being operable to sense turns of rotation of the shaping bar 53 and transmit a detection signal thereof to the electric machine control assembly 3, so that based on the turns of rotation of the shaping bar 53 inputted from the sensor 54, the electric machine control assembly 3 may instruct the power portion 51 to stop operation and then rotate reversely to have the shaping bar 53 make rotation in a direction opposite to the original rotation direction.

As shown in FIGS. 1, 2, 3, 4, and 5, the clamp unit 6 is arranged on the second slide block 42 of the push unit 4, so that when the push unit 4 is sliding back and forth for the predetermined distance in the longitudinal axis direction of the chassis 2 on the first rail 21 and the second rail 22 of the chassis 2, the clamp unit 6 slides back and forth, in synchronization with the push unit 4, for the predetermined distance in the longitudinal axis direction of the chassis 2; the clamp unit 6 comprises a power portion 61, a slide push portion 62 driven by the power portion 61, a clamping portion 63 pushable by the slide push portion 62; the power portion 61 is implemented in the present invention in the form of an electrical motor, the power portion 61 being electrically connected to the electric machine control assembly 3 to obtain electrical power supply necessary for operation; a front end of the power portion 61 is connected with a pushing block 611, and a position sensor 612 is arranged beside the pushing block 611, the position sensor 612 being electrically connected to the electric machine control assembly 3, so that the position sensor 612 senses a moving distance of the pushing block 611 and transmits a signal sensed thereby to the electric machine control assembly 3, and the electric machine control assembly 3 then instructs the power portion 61 to operate, stop operation, or rotate reversely; the pushing block 611 is driven by the power portion 61 to push back and forth for a predetermined distance in the longitudinal axis direction of the chassis 2; the clamping portion 63 comprises an operating block 631 and a plurality of clamping blocks 632 pushable by the operating block 631, the pushing block 611 being driven by the power portion 61 to push the operating block 631 toward one side, the operating block 631 then making the plurality of clamping blocks 632 concentrating toward a center to perform an clamping operation; specifically, the shaping bar 53 of the rotation unit 5 extends, with the threaded portion 531, through a central opening of the operating block 631 to penetrate into the center of the plurality of clamping blocks 632; when the pushing block 611 is driven by the power portion 61 to push the operating block 631 toward one side, the operating block 631 makes the plurality of clamping blocks 632 concentrating toward the center to carry out an operation of clamping and positioning the shaping bar 53.

As shown in FIGS. 1, 2, 3, 4, and 5, the heating and forming unit 7 is arranged at one side of the chassis 2 that is distant from the first rail 21, and more specifically, the heating and forming unit 7 is arranged beside an outer side of the second rail 22 of the chassis 2; the heating and forming unit 7 is electrically connected to the electric machine control assembly 3 to obtain electrical power supply necessary for operation, and the heating and forming unit 7 comprises a power portion 71, an operating portion 72 driven by the power portion 71, and a heating and forming portion 73 connected to the operating portion 72; the power portion 71 is implemented in the present invention in the form of an electrical motor; the power portion 71 is electrically connected to the electric machine control assembly 3 to obtain electrical power supply necessary for operation, and is controllable by the electric machine control assembly 3 to operate; the operating portion 72 is driven by the power portion 71 to operate, and in the present invention, the operating portion 72 is implemented in the form of a hydraulic cylinder, the operating portion 72 being operable to drive the heating and forming portion 73 to carry out an operation of clamping and heating, the heating and forming portion 73 comprising a clamping and heating member 731, a thermal isolation member 732 arranged at an outside (in an up-down direction of the drawings) of the clamping and heating member 731; the heating and forming portion 73 is operable to clamp the threaded portion 531 of the shaping bar 53 for carrying out a heating and pressing operation; the heating and forming portion 73 is electrically connected to the electric machine control assembly 3 to obtain electrical power supply necessary for operation, meaning a heat source of the clamping and heating member 731 is implemented in the present invention in the form of electrical heating, the electric machine control assembly 3 being also operable to control activation and deactivation of the heating and forming portion 73; the heating and forming portion 73 is further provided with a pressure sensor (not shown in the drawings) to ensure the pressure induced by pressing by the heating and forming portion 73.

As shown in FIGS. 1, 2, 3, 4, and 5, the clip unit 8 is arranged at one side of the chassis 2 that is distant from the first rail 21, and more specifically, the clip unit 8 is arranged further outside of the heating and forming unit 7 that is beside an outer side of the second rail 22 of the chassis 2; the clip unit 8 comprises a power portion 81 and a clipping portion 82 driven by the power portion 81 to perform a clipping operation; the power portion 81 is implemented in the present invention in the form of an electrical motor, the power portion 81 being electrically connected to the electric machine control assembly 3 to obtain electrical power supply necessary for operation, the power portion 81 being also controllable by the electric machine control assembly 3 to operate or not to operate, so that the power portion 81 drives the clipping portion 82 to carry out an operation of clipping or to release the operation of clipping.

Figure 12:
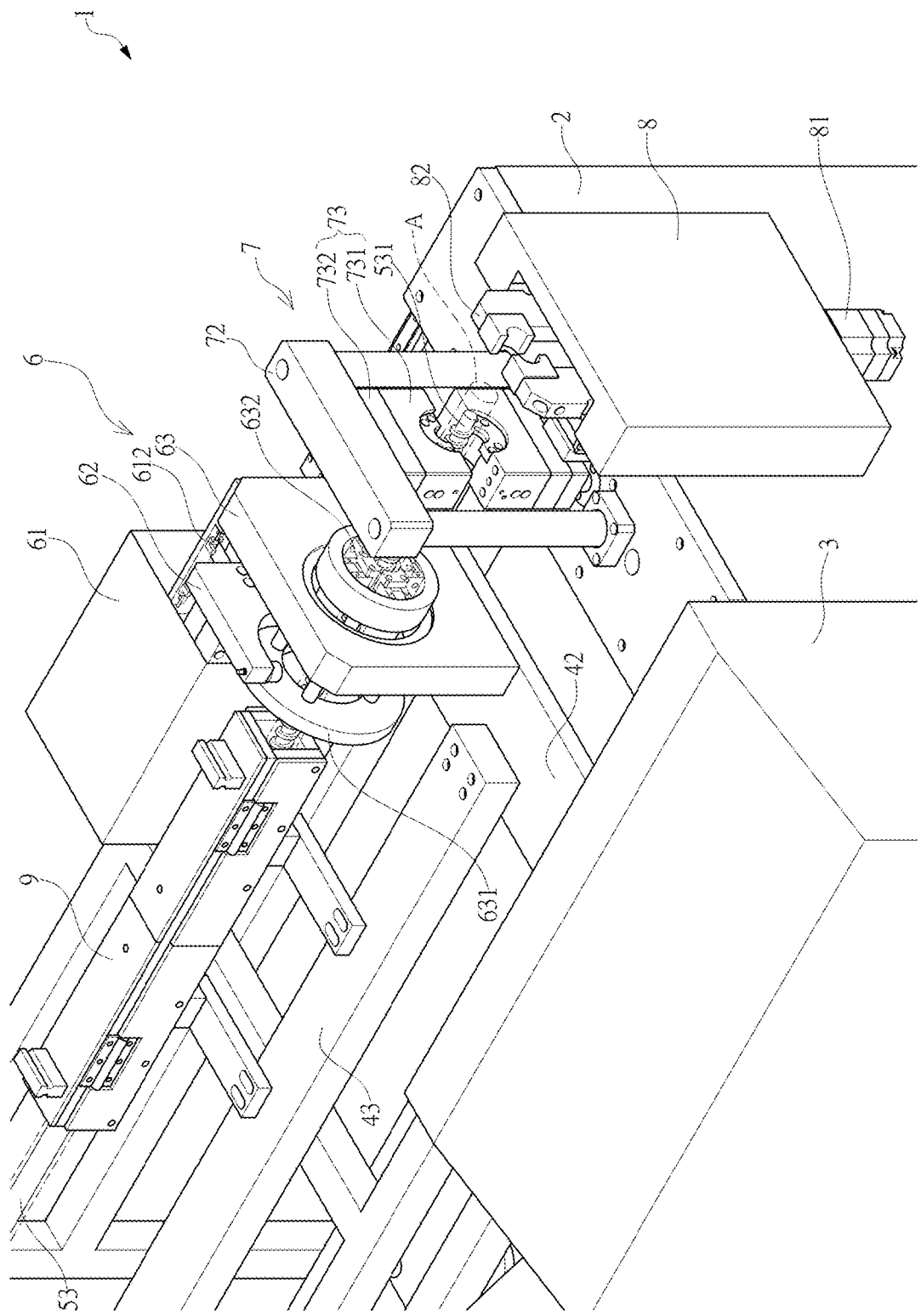
FIG. 12 is an embodiment of a preheating unit according to the present invention.

As shown in FIG. 12, the thermoforming pipe-shaping machine 1 according to the present invention further comprises a preheating unit 9 arranged frontward of the clamp unit 6, the preheating unit 9 being operable to receive the shaping bar 53 on which a Teflon pipe A is sleeved to extend therein for carrying out a preheating operation on the Teflon pipe A; more specifically, preheating and softening are induced on the Teflon pipe A sleeved on the shaping bar 53 in heating and pressing to form a spiral section by the heating and forming portion 73 of the heating and forming unit 7, so as to ease formation of the spiral section on the Teflon pipe A during heating and pressing in the heating and forming portion 73 of the heating and forming unit 7; the preheating unit 9 is implemented in the present invention in the form of electrical heating, and the preheating unit 9 is electrically connected to the electric machine control assembly 3 to obtain electrical power supply necessary for operation.

As shown in FIGS. 1, 2, 5, 6, 7, 8, 9, 10, and 11, a specific way of operation of the thermoforming pipe-shaping machine 1 according to the present invention is such that, firstly, the Teflon pipe A for chemical industry is sleeved on the shaping bar 53 of the rotation unit 5, and in the implementation of the present invention, the Teflon pipe A can be a plastic pipe that is resistant to corrosion, and then, the shaping bar 53 on which the Teflon pipe A is sleeved is inserted, with another end thereof that has the threaded portion 531, into and clamped in the fitting and clamping section 52 of the rotation unit 5, and the shaping bar 53 on which the Teflon pipe A is sleeved is further inserted, with the threaded portion 531, sequentially into the clamping portion 63 of the clamp unit 6 and the heating and forming portion 73 of the heating and forming unit 7; at this time, an activation button (not shown in the drawings) of the electric machine control assembly 3 is actuated to have the power portion 51 of the rotation unit 5 clamping the shaping bar 53 and driving the shaping bar 53 to rotate (revolve); meanwhile, the power portion 44 of the push unit 4 operates to have the push unit 4 sliding in the longitudinal axis direction of the chassis 2; when the push unit 4 slides in the longitudinal axis direction of the chassis 2 by the predetermined distance, the electric machine control assembly 3 activates the clamp unit 6 to operate, and the power portion 61 of the clamp unit 6 then operates to drive the pushing block 611, and the pushing block 611 then causes the clamping portion 63 to clamp the shaping bar 53, and meanwhile, the power portion 71 of the heating and forming unit 7 is also activated, and the power portion 71 drives the operating portion 72 to operate, and the operating portion 72 makes the heating and forming portion 73 carrying out a shaping operation through heating and pressing on the threaded portion 531 of the shaping bar 53; and meanwhile, the power portion 51 of the rotation unit 5 continues driving the shaping bar 53 to rotate, and the power portion 44 of the push unit 4 also continues sliding in the longitudinal axis direction of the chassis 2 to thereby have the shaping bar 53 advancing toward the clip unit 8 and extending into the clipping portion 82.

As shown in FIGS. 1, 3, 4, 6, 7, 8, 9, 10, and 11, following the above, when the power portion 44 of the push unit 4 continues sliding in the longitudinal axis direction of the chassis 2 to reach the preset distance, the present invention taking the length of the first rail 21 and the second rail 22 of the chassis 2 as the sliding distance of the push unit 4 in the longitudinal axis direction of the chassis 2, the clipping portion 82 of the clip unit 8 performs a clipping operation to clip on an already-spiraled portion of the shaping bar 53; at this time, the clamp unit 6 and the heating and forming unit 7 release the operations of clamping and heating and pressing on the shaping bar 53, and synchronously, the electric machine control assembly 3 makes the power portion 51 of the rotation unit 5 rotate reversely to have the shaping bar 53 screwing reversely to move out of the pipe that has been processed into a spiral form, and at the same time, the power portion 44 of the push unit 4 is also made operating reversely by the electric machine control assembly 3, and the push unit 4 slides in the longitudinal axis direction of the chassis 2 back to the original position, so that the shaping bar 53 screws out of the pipe that has been processed into the spiral form, and a section of the Teflon pipe A has thus been processed into the spiral form and is exposed, and this completes a processing process that the thermoforming pipe-shaping machine 1 of the present invention performs heating and pressing on the Teflon pipe A to form a spiral section; if the Teflon pipe A requires a continuous spiral section for an entire long section, the electric machine control assembly 3 first makes the clipping portion 82 of the clip unit 8 releases the operation of clipping on the shaping bar 53, and then repeating the above-described processing process continuing from an end of the already-formed spiral section to have the Teflon pipe A possessing a comprises a continuous spiral section for an entire long section.

As shown in FIGS. 1, 6, 7, 8, 9, 10, and 11, further following the above, when the Teflon pipe A needs, after a straight section posterior to a spiral section, to have a spiral section again, the Teflon pipe A is subjected to the above-described processing process in a section-by-section intermittent manner by means of the electric machine control assembly 3 making the clipping portion 82 of the clip unit 8 release the operation of the shaping bar 53, an engineering operator pulling an un-processed portion of the Teflon pipe A, and having the Teflon pipe A sliding towards the clipping portion 82 of the clip unit 8, meaning having a pipe portion of the Teflon pipe A between the heating and forming unit 7 and the clip unit 8 separating from the threaded portion 531 of the shaping bar 53, this portion being a preset straight section of the Teflon pipe A, and at this time, the electric machine control assembly 3 is activated again, and the thermoforming pipe-shaping machine 1 of the present invention once again carries out processing of heating and pressing to form a spiral section on the Teflon pipe A; the thermoforming pipe-shaping machine 1 according to the present invention, by means of the above-described structure and processing process, at least comprises the following advantages: (1) enabling progressive adjustment of a pressing mode in order to reduce the rate of failure for initial pressing thermoforming; (2) pressing temperature being adjustable and before-forming preheating setting module further ensure the effect of shaping; (3) enabling processing for multiple spiral sections and also allowing for continuous spiral processing to thereby make processing diversified and eased; (4) preventing occurrence of deficiency for repeating processing;(5) preventing erroneously arranging of screws; (6) ensuring pressing degree of screws to thereby ensure processing accuracy.

As shown in FIGS. 2, 3, 4, 7, 8, and 9, the thermoforming pipe-shaping machine 1 comprises the chassis 2, the electric machine control assembly 3 arranged at one side of the chassis 2, the push unit 4 arranged on the chassis 2, the rotation unit 5 arranged on the push unit 4, the clamp unit 6 arranged at one side of the push unit 4, the heating and forming unit 7 arranged at one side of the chassis 2, and the clip unit 8 arranged at one end side of the chassis 2; the rotation unit 5 receives the shaping bar 53 on which the Teflon pipe A to be processed is sleeved to fit therein and clamped thereby, the shaping bar 53 at least comprising, at one end, the threaded portion 531, the rotation unit 5 driving the shaping bar 53 to rotate; the push unit 4 is operable to push the rotation unit 5 to slide on the chassis 2, the clamp unit 6 being operable to clamp the shaping bar 53 on which the Teflon pipe A to be processed is sleeved, the heating and forming unit 7 being operable to perform a processing operation of heating and pressing on the threaded portion 531 of the shaping bar 53 on which the Teflon pipe A to be processed is sleeved to have the Teflon pipe A to be processed sleeved on the threaded portion 531 of the shaping bar 53 shaped into a spiral form; as such, diversification and processing accuracy of processing the Teflon pipe A of chemical industry into a spiral form can be enhanced.

We claim:

1. A thermoforming pipe-shaping machine, comprising a chassis, an electric machine control assembly arranged at one side of the chassis, a push unit arranged on the chassis, a rotation unit arranged on the push unit, a clamp unit arranged on one side of the push unit, a heating and forming unit arranged on one side of the chassis, a clip unit arranged at an end side of the chassis; the rotation unit receiving a shaping bar on which a Teflon pipe to be processed is sleeved, the shaping bar at least comprising one end threaded portion, the rotation unit being operable to drive the shaping bar to rotate; the push unit being operable to push the rotation unit to slide on the chassis, the clamp unit being operable to clamp the shaping bar on which the Teflon pipe to be processed is sleeved, the heating and forming unit being operable to carry out a processing operation of heating and pressing on the threaded portion of the shaping bar on which the Teflon pipe to be processed is sleeved to have the Teflon pipe to be processed sleeved on the threaded portion of the shaping bar shaped into a spiral form.

2. The thermoforming pipe-shaping machine according to claim 1, wherein two side ends of the chassis are respectively provided with a first rail and a second rail arranged pairwise as a left one and a right one; the first rail and the second rail receive the push unit to dispose thereon; the chassis is provided with the electric machine control assembly at a lower side of the second rail; two end sides of the push unit are respectively provided with a first slide block and a second slide block; the first slide block is arranged, in a slidable manner, on the first rail of the chassis, and the second slide block is arranged, in a slidable manner, on the second rail of the chassis.

3. The thermoforming pipe-shaping machine according to claim 2, wherein the push unit is provided with a connection rod arranged on the first slide block and the second slide block; the push unit is connected to a power portion at a lower side of the first slide block, the power portion being provided with a position sensor.

4. The thermoforming pipe-shaping machine according to claim 1, wherein two end sides of the push unit are respectively provided with a first slide block and a second slide block; the rotation unit is arranged on the first slide block of the push unit; the rotation unit comprises a power portion, a front end of the power portion being provided with a fitting and clamping section, the fitting and clamping section receiving the shaping bar to fit therein and clamp thereby; the power portion, during operation thereof, drives the shaping bar to rotate so as to revolve.

5. The thermoforming pipe-shaping machine according to claim 4, wherein the power portion is provided with a sensor beside the fitting and clamping section.

6. The thermoforming pipe-shaping machine according to claim 1, wherein two end sides of the push unit are respectively provided with a first slide block and a second slide block; the clamp unit is arranged on the second slide block of the push unit; the clamp unit comprises a power portion, a slide push portion drivable by the power portion, and a clamping portion pushable by the slide push portion; a front end of the power portion is connected with a pushing block, a position sensor arranged beside the pushing block; the clamping portion comprises an operating block and a plurality of clamping blocks drivable by the operating block.

7. The thermoforming pipe-shaping machine according to claim 1, wherein a preheating unit is arranged frontward of the clamp unit.

8. The thermoforming pipe-shaping machine according to claim 6, wherein a preheating unit is arranged frontward of the clamp unit.

9. The thermoforming pipe-shaping machine according to claim 1, wherein the heating and forming unit comprises a power portion, an operating portion drivable by the power portion, and a heating and forming portion connected to the operating portion; the operating portion being drivable by the power portion to operate, the operating portion driving the heating and forming portion to carry out an operation of clamping and heating and pressing, the heating and forming portion comprising a clamping and heating member, and a thermal isolation member arranged at an outer side of the clamping and heating member.

10. The thermoforming pipe-shaping machine according to claim 1, wherein the clip unit comprises a power portion and a clipping portion drivable by the power portion to carry out an operation of clipping.

* * * * *